(No Model.)
I. H. ATHEY.
FIRE ESCAPE.
No. 456,281. Patented July 21, 1891.
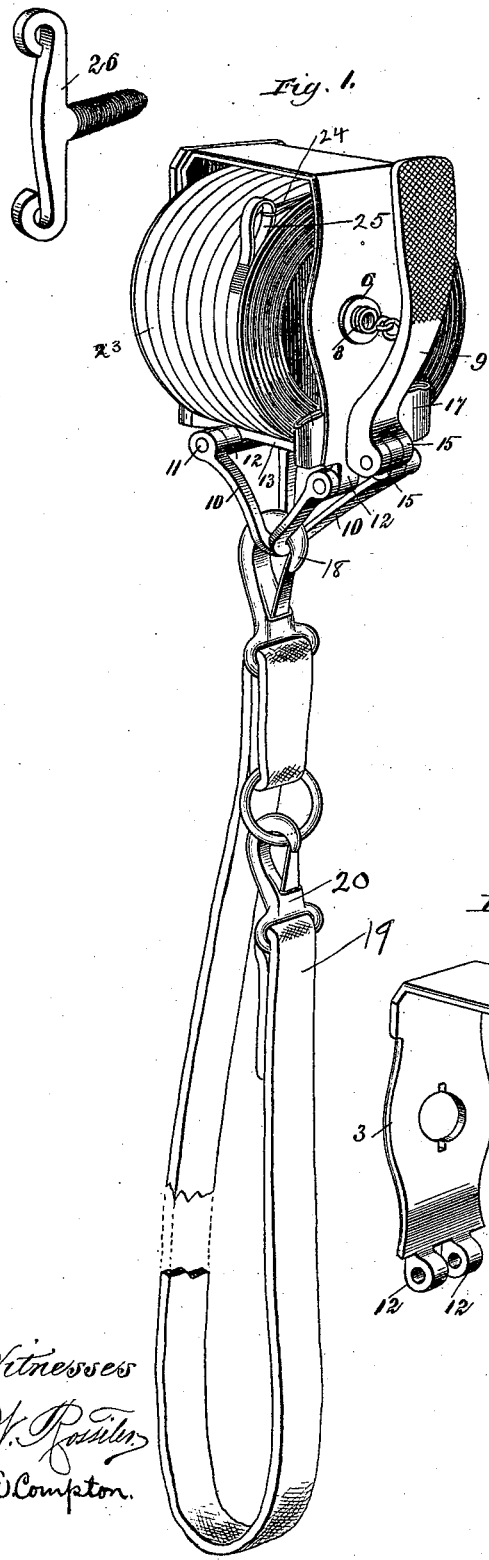
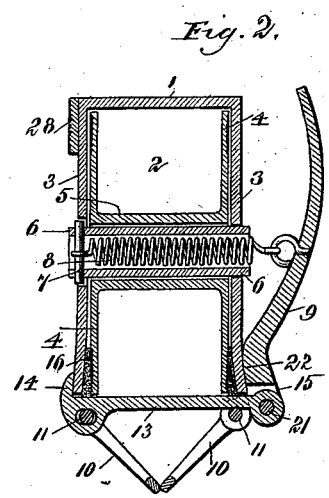
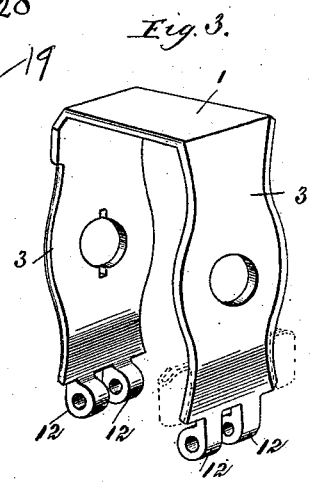
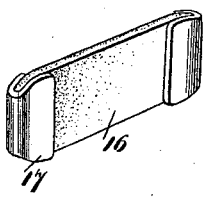
Witnesses
W. Rossiter
N. O. Compton.
Inventor
Isaac H. Athey
By Paine & Fisher
His Attys.

UNITED STATES PATENT OFFICE.

ISAAC H. ATHEY, OF MARION, ARKANSAS, ASSIGNOR TO THE TRAVELLER'S POCKET FIRE ESCAPE COMPANY, OF SAME PLACE.

FIRE-ESCAPE.

SPECIFICATION forming part of Letters Patent No. 456,281, dated July 21, 1891.

Application filed May 26, 1890. Serial No. 353,232. (No model.)

*To all whom it may concern:*

Be it known that I, ISAAC H. ATHEY, a resident of Marion, county of Crittenden, State of Arkansas, have invented certain new and useful Improvements in Fire - Escapes, of which the following is hereby declared to be a full, clear, and exact description, sufficient to enable others skilled in the art to which such improvements appertain to make and use the same.

The invention relates to portable fire-escapes, and more especially to such wherein the revolving reel which carries the main line or wire is mounted within a supporting-frame having a compressible clamp-jaw, the jaw being forced positively against the reel-head when the apparatus is in use, serving thereby to lessen the speed at which the reel would otherwise rotate, and thus acting to govern the rapidity of descent.

An example of fire-escapes of the general character named is found in my Letters Patent No. 402,053, dated April 23, 1889, and the present invention, among other purposes, is directed to the structural improvement of fire-escapes such as are set forth by said patent. In preferred form the design is to produce a device which is simple, compact, light in weight, easily carried, and readily set in place and capable of being quickly put into use when occasion requires.

The exact nature of the improvements will appear from the description following, and be thereafter more distinctly pointed out by the claims at the conclusion thereof.

In the accompanying drawings, forming part of this specification, like parts of structure are distinguished by like designating characters throughout.

Figure 1 is a view in perspective of the improved fire-escape; Fig. 2, a longitudinal sectional view, the reel-wire and body-strap being removed; Figs. 3 and 4, detail views of the supporting-frame and brake-shoe, respectively.

The supporting-frame which carries the reel 2 consists of a stout top bar 1, having the side bars 3 depending therefrom, each of said bars being preferably made of such dimension as to yield elastically to a slight extent when pressed or drawn upon laterally near their lower ends, whereby they serve as clamp-jaws to bear against the adjacent heads 4 of the reel, and thus to control the speed of rotation. The barrel 5 of the reel 2 snugly incloses the sleeve 6, which latter rests at its ends in the holes of the side bars 3, and is keyed to place by means of the cross-pin 7, passing through the barrel and sustained in the seats of one of the side bars 3. The sleeve 6 furnishes an extended journal-support for the barrel of the reel, said reel turning easily thereon without undue wear or strain, while the sleeve 6, being itself fixed, exerts no abrading influence upon its bearings in side bars 3. Accordingly the side bars are not worn or cut, while the risk of overheating the supporting-frame, which might result were the reel journaled directly on the side bars, is very much lessened. The cross-pin 7 retains one terminal of the coil-spring 8, the spring extending thence through the hollow sleeve 6 and at its opposite end being secured to the brake-lever 9. In such relation the spring 8 acts reciprocally to hold both the sleeve and lever in proper position, so that neither can become displaced during operation, and, being secured under tension to the lever 9, the spring acts also to set the clamp-jaws slightly, and thus to hold the reel from free rotation.

At their lower ends the clamp-jaws 3 are furnished with converging loops 10, which in the form shown consist of swinging links secured by pivot-pins 11 to the eye-terminals 12 on the clamp-jaws. The eye-terminals 12 are usually made in piece with the supporting-frame and are located as near as may be convenient (in setting) to the reel-head rims. Swiveled upon one of the pivot-pins 11 between the eye-terminals 12 is the brake-link 13, which extends across and just above the companion pin, and is pivotally secured, as at 21, between the bosses 15 of the brake-lever 9. At its opposite end the brake-link preferably overlaps the adjacent face of the clamp-jaw, as at 14, to a slight extent, so that it bears thereon at about the level of the reel-head rim to better insure the clamp-jaw against permanent spring or bend. The brake-link is slotted at its swivel connection with the pin 11, so as to afford play sufficient to transfer the point of application against the clamp-jaw in manner just described. The brake-lever 9, pivoted, as at 21, to the cross-link 13, has a cam-like face 22 to bear against the clamp-jaw 3, and when pressed inward at its free end the lever pulls upon the link 13, so that the jaws 3 are forced by cam 22 and lip 14 toward the reel-heads.

Preferably between each reel-head 4 and the adjoining clamp-jaw 3 is arranged the brake-shoe 16, which consists of a strip of leather or the like having metal clips 17 at its ends overlapped, as shown, so that one edge of the clip may fit snugly against the neighboring edge of the clamp-jaw 3. The lower part of each clamp-jaw is bulged slightly to receive the brake-shoe, and the reel-heads may be finely grooved at the contact-face with the brake-shoes to enable the latter to act more effectively. For the same reason the reel is usually tin-coated, although such coating is not absolutely essential.

The use of the separate brake-shoes in manner proposed relieves the clamp-jaws and reel-heads from much of the frictional wear which must otherwise ensue were these directly in contact, and yet one or both of the shoes may be omitted or brake-pads of other form be used instead. The style of shoe shown is simple and is easily replaced, and when in position is stoutly retained by reason of the edge bearing of clips 17 against the jaws 3. The converging eye-loops 10 receive the hook 18 of the body-strap 19, a supplemental snap-hook 20 upon such strap being used to advantage in securing the strap about the person beneath the arms of the user. The wire 23 is preferably made from aluminium bronze and flat in form to wrap compactly about its reel. Other material can be used instead, although the bronze specified is light, tough, and of high tensile strength. For the same length a wire of bronze requires a smaller reel than if steel were used, so that the leverage in unwinding becomes less in consequence, and the brake mechanism is capable of acting more efficiently. A light tie 24 holds the free end of the wire 23 in coil. The eye 25 is slipped edgewise over the close guard of hook 26, and is then turned so that the eye seats within the hook and cannot be easily released. The hook 26 has its screw-shank gimlet-pointed for prompt insertion, and is usually made with a double head, as shown, to turn more readily and to afford, also, a broad bearing across the head to better aid in sustaining the load. A plate 28, of gutta-percha or like non-conductor, is conveniently fastened across the upper end of one side bar 3 and insures the fingers against overheating when the free end of lever 9 is in the grasp of the hand with the apparatus in play.

The precise details hereinbefore set forth may be varied in measure without departing from the spirit of the invention. Thus, for example, only one of the side bars 3 need yield elastically, although for evenness in run and strain the equal play of both is desirable. One or both of the loops 10 may be rigid instead of being pivotally set, care being observed to bring the point of suspension for the body-strap 19 at about the center of the reel width. This maintains even run and balance for the wire during unreeling, and provides, also, for equal stress on the clamp-jaws 3 under weight of the body of the operator. The lever 9 supplements the brake action and may be applied so as to arrest the unwinding of the wire absolutely at any stage of descent. The plate 28 is ordinarily roughened, and serves thus as a grip to steady the fingers when the brake-lever is being pressed upon.

Having thus described my invention, what I claim as new, and desire to secure by Letters Patent, is—

1. In a fire-escape, the combination, with a revoluble reel for carrying the line or wire, and with a suitable supporting-frame therefor, having jaws adapted to inclose, sustain, and compress the outer faces of the reel-heads, of a brake device having both positive and spring connection with the said jaws and adapted to be controlled by the hand of the operator, whereby a constantly-acting elastic pressure is applied to said brake device and a positive pressure may be applied thereto at will, substantially as described.

2. In a fire-escape, the combination, with a revoluble reel and with a suitable supporting-frame therefor, having a compressible clamp-jaw and a companion jaw to inclose the reel-heads, of a tubular sleeve mounted in said jaws, a coiled spring passing through said sleeve, and a suitable brake device adapted to be controlled by the hand of the operator for compressing the clamp-jaws, said coiled spring being connected to said brake device, whereby the pressure of the clamp-jaws will be maintained, substantially as described.

3. In a fire-escape, the combination, with the supporting-frame and its compressible clamp-jaws, of the revolving reel and its barrel, the sleeve mounted in said jaws and supporting the reel-barrel, the brake-lever carried by said frame, and the spring connection between said lever and sleeve, substantially as described.

4. In a fire-escape, the combination, with the revolving reel and with the supporting-frame having compressible clamp-jaws, of the removable brake-shoe, substantially as described.

5. In a fire-escape, the combination, with the revolving reel and with the supporting-frame having compressible clamp-jaws, of the removable brake-shoe provided with end clips to embrace the edges of the clamp-jaw, substantially as described.

6. In a fire-escape, the combination, with the supporting-frame and its compressible clamp-jaws, of the revolving reel sustained between said jaws, the converging loops pivotally swung from said jaws, the brake-lever, and the cross-link carried by the loop-pivots and swiveled to said lever and at its opposite end having an upturned lip to engage the clamp-jaw, substantially as described.

7. In a fire-escape, the combination, with the frame 1, having clamp-jaws 3, and with the reel 2, having barrel 5, of the sleeve 6, whereon said barrel journals, said sleeve being seated in clamp-jaws 3, the cross-pin 7, coil-spring 8, and brake-lever 9, pivotally sustained from the main frame, substantially as described.

8. In a fire-escape, the combination, with the revolving reel and its clamp-jaw frame, of the brake-lever and the opposing non-conducting plate carried by said frame, substantially as described.

ISAAC H. ATHEY.

Witnesses:
JAMES H. PEIRCE,
GEO. P. FISHER, Jr.